US011265748B2

(12) United States Patent
Xue et al.

(10) Patent No.: US 11,265,748 B2
(45) Date of Patent: Mar. 1, 2022

(54) UPLINK CLEAR CHANNEL ASSESSMENT STATUS AS A NEW UPLINK CONTROL INFORMATION FOR NEW RADIO-UNLICENSED

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/576,447

(22) Filed: Sep. 19, 2019

(65) Prior Publication Data
US 2020/0137603 A1 Apr. 30, 2020

Related U.S. Application Data

(60) Provisional application No. 62/749,989, filed on Oct. 24, 2018.

(51) Int. Cl.
| | |
|---|---|
| *H04W 24/10* | (2009.01) |
| *H04L 5/00* | (2006.01) |
| *H04W 72/04* | (2009.01) |
| *H04W 72/12* | (2009.01) |

(52) U.S. Cl.
CPC .......... *H04W 24/10* (2013.01); *H04L 5/0048* (2013.01); *H04W 72/0413* (2013.01); *H04W 72/1284* (2013.01)

(58) Field of Classification Search
CPC ............ H04W 24/10; H04W 72/0413; H04W 72/1284; H04L 5/0048
See application file for complete search history.

(56) References Cited

U.S. PATENT DOCUMENTS

| | | | |
|---|---|---|---|
| 2017/0105233 A1 | 4/2017 | Zhang et al. | |
| 2017/0135128 A1* | 5/2017 | Yerramalli | ........ H04W 74/0808 |
| 2018/0027554 A1 | 1/2018 | Yerramalli et al. | |
| 2019/0075581 A1* | 3/2019 | Salem | ................. H04W 74/006 |
| 2019/0253976 A1* | 8/2019 | Pelletier | .............. H04W 52/346 |

OTHER PUBLICATIONS

International Search Report and Written Opinion—PCT/US2019/052054—ISA/EPO—dated Jan. 28, 2020.
(Continued)

*Primary Examiner* — Duc C Ho
(74) *Attorney, Agent, or Firm* — Liem T. Do

(57) ABSTRACT

Uplink clear channel assessment (CCA) status is disclosed as a new uplink control message for new radio (NR) unlicensed (NR-U) operations. When an opportunity for potential uplink transmissions arises for a user equipment (UE), the UE will perform a CCA procedure on available uplink resources. The UE reports the results of the CCA procedure to a serving base station via an uplink control message, such as an uplink control information (UCI), physical uplink control channel (PUCCH), or the like. The serving base station may then use the CCA results in scheduling uplink transmissions and reserving uplink resources.

23 Claims, 9 Drawing Sheets

(56) References Cited

OTHER PUBLICATIONS

Partial International Search Report—PCT/US2019/052054—ISA/EPO—dated Dec. 4, 2019.
Qualcomm Incorporated: "Autonomous UL Transmission in NR Unlicensed", 3GPP Draft; R1-1804832, 7.6.5 NR-U AUL, 3rd Generation Partnership Project (3GPP), Mobile Competence Centre; 650, Route Des Lucioles ; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051427098, 7 Pages, Retrieved from the Internet: URL:http://www.3gpp.org/ftp/Meetings%5F3GPP%5FSYNC/RAN1/Docs/ [retrieved on Apr. 15, 2018], p. 4, paragraph 3.1, p. 5, paragraph 3.2.
ZTE: "Considerations on Measurements for LAA," 3GPP Draft, R1-150151 Considerations on Measurements for LAA Final, 3rd Generation Partnership Project (3GPP), Mobile Competence Centre, 650, Route Des Lucioles, F-06921 Sophia-Antipolis Cedex ; FRA vol. RAN WG1. no. Athens. Greece; Feb. 9, 2015-Feb. 13, 2015, Feb. 8, 2015 (Feb. 8, 2015). XP050933365, 6 Pages, Retrieved from the Internet: URL:http://www.3gpp.org/ftp/Meetings_3GPP_SYNC/RAN1/Docs/ [retrieved on Feb. 8, 2015] Chapter 2.2 "RRM measurement," Chapter 2.3 n CSI Measurement, p. 3, paragraph 2.3.

\* cited by examiner

UPLINK CLEAR CHANNEL ASSESSMENT STATUS AS A NEW UPLINK CONTROL INFORMATION FOR NEW RADIO-UNLICENSED

CROSS-REFERENCE TO RELATED APPLICATIONS

This application claims the benefit of U.S. Provisional Patent Application No. 62/749,989, entitled, "UPLINK CCA STATUS AS A NEW UCI FOR NR-U," filed on Oct. 24, 2018, which is expressly incorporated by reference herein in its entirety.

BACKGROUND

Field

Aspects of the present disclosure relate generally to wireless communication systems, and more particularly, to uplink clear channel assessment (CCA) status as a new uplink control information (UCI) for new radio (NR) unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes identifying, by a user equipment (UE), an initial signal from a serving base station over a contention-based shared communication spectrum, wherein the initial signal identifies establishment of a current base station transmission opportunity (TxOP), performing, by the UE, a clear channel assessment (CCA) procedure on the contention-based shared communication spectrum available for communications by the UE, signaling, by the UE, a CCA status report to the serving base station in an uplink control message, wherein the CCA status report reports a result of the CCA procedure, receiving, by the UE, an uplink grant for transmission of uplink data, wherein the uplink grant allocates a set of uplink resources from a plurality of available uplink resources for the transmission, and transmitting, by the UE, the uplink data using the set of uplink resources.

In an additional aspect of the disclosure, a method of wireless communication includes signaling, by a base station, an initial signal in response to establishing a current TxOP over a contention-based shared communication spectrum, receiving, by the base station, an uplink control message from one or more served UEs, wherein the uplink control message includes a CCA status report reporting results of a CCA procedure conducted by the one or more served UEs, scheduling, by the base station, the one or more served UEs for uplink transmissions on a set of resources of a plurality of available uplink resources, wherein the set of resources is selected based on the CCA status report, transmitting, by the base station, an uplink grant for the uplink transmissions to the one or more UEs, wherein the uplink grant identifies the set of uplink resources, and receiving, by the base station, uplink data from the one or more served UEs on the set of uplink resources.

In an additional aspect of the disclosure, a method of wireless communication includes identifying, by a UE, an initial signal from a serving base station over a contention-based shared communication spectrum, wherein the initial signal identifies establishment of a current base station TxOP, performing, by the UE, a CCA procedure on the contention-based shared communication spectrum available for communications by the UE, generating, by the UE, a reduced format sounding reference signal (SRS) that identifies at least a successful result of the CCA procedure, and transmitting, by the UE, the reduced format SRS identifying the successful result in response to the CCA procedure having the successful CCA procedure.

In an additional aspect of the disclosure, an apparatus configured for wireless communication includes means for identifying, by a UE, an initial signal from a serving base station over a contention-based shared communication spectrum, wherein the initial signal identifies establishment of a current base station TxOP, means for performing, by the UE, a CCA procedure on the contention-based shared communication spectrum available for communications by the UE, means for signaling, by the UE, a CCA status report to the serving base station in an uplink control message, wherein the CCA status report reports a result of the CCA procedure, means for receiving, by the UE, an uplink grant for transmission of uplink data, wherein the uplink grant allocates a set of uplink resources from a plurality of available uplink resources for the transmission, and means for transmitting, by the UE, the uplink data using the set of uplink resources.

In an additional aspect of the disclosure, an apparatus configured for wireless communication includes means for signaling, by a base station, an initial signal in response to establishing a current TxOP over a contention-based shared communication spectrum, means for receiving, by the base station, an uplink control message from one or more served UEs, wherein the uplink control message includes a CCA status report reporting results of a CCA procedure conducted by the one or more served UEs, means for scheduling, by the base station, the one or more served UEs for uplink transmissions on a set of resources of a plurality of available uplink resources, wherein the set of resources is selected based on the CCA status report, means for transmitting, by the base station, an uplink grant for the uplink transmissions to the one or more UEs, wherein the uplink grant identifies the set of uplink resources, and means for receiving, by the base station, uplink data from the one or more served UEs on the set of uplink resources.

In an additional aspect of the disclosure, an apparatus configured for wireless communication includes means for identifying, by a UE, an initial signal from a serving base station over a contention-based shared communication spectrum, wherein the initial signal identifies establishment of a current base station TxOP, means for performing, by the UE, a CCA procedure on the contention-based shared communication spectrum available for communications by the UE, means for generating, by the UE, a reduced format SRS that identifies at least a successful result of the CCA procedure, and means for transmitting, by the UE, the reduced format SRS identifying the successful result in response to the CCA procedure having the successful CCA procedure.

In an additional aspect of the disclosure, a non-transitory computer-readable medium having program code recorded thereon. The program code further includes code to identify, by a UE, an initial signal from a serving base station over a contention-based shared communication spectrum, wherein the initial signal identifies establishment of a current base station TxOP, code to perform, by the UE, a CCA procedure on the contention-based shared communication spectrum available for communications by the UE, code to signal, by the UE, a CCA status report to the serving base station in an uplink control message, wherein the CCA status report reports a result of the CCA procedure, code to receive, by the UE, an uplink grant for transmission of uplink data, wherein the uplink grant allocates a set of uplink resources from a plurality of available uplink resources for the transmission, and code to transmit, by the UE, the uplink data using the set of uplink resources.

In an additional aspect of the disclosure, a non-transitory computer-readable medium having program code recorded thereon. The program code further includes code to signal, by a base station, an initial signal in response to establishing a current TxOP over a contention-based shared communication spectrum, code to receive, by the base station, an uplink control message from one or more served UEs, wherein the uplink control message includes a CCA status report reporting results of a CCA procedure conducted by the one or more served UEs, code to schedule, by the base station, the one or more served UEs for uplink transmissions on a set of resources of a plurality of available uplink resources, wherein the set of resources is selected based on the CCA status report, code to transmit, by the base station, an uplink grant for the uplink transmissions to the one or more UEs, wherein the uplink grant identifies the set of uplink resources, and code to receive, by the base station, uplink data from the one or more served UEs on the set of uplink resources.

In an additional aspect of the disclosure, a non-transitory computer-readable medium having program code recorded thereon. The program code further includes code to identify, by a UE, an initial signal from a serving base station over a contention-based shared communication spectrum, wherein the initial signal identifies establishment of a current base station TxOP, code to perform, by the UE, a CCA procedure on the contention-based shared communication spectrum available for communications by the U code to generate, by the UE, a reduced format SRS that identifies at least a successful result of the CCA procedure, and code to transmit, by the UE, the reduced format SRS identifying the successful result in response to the CCA procedure having the successful CCA procedure.

In an additional aspect of the disclosure, an apparatus configured for wireless communication is disclosed. The apparatus includes at least one processor, and a memory coupled to the processor. The processor is configured to identify, by a UE, an initial signal from a serving base station over a contention-based shared communication spectrum, wherein the initial signal identifies establishment of a current base station TxOP, to perform, by the UE, a CCA procedure on the contention-based shared communication spectrum available for communications by the UE, to signal, by the UE, a CCA status report to the serving base station in an uplink control message, wherein the CCA status report reports a result of the CCA procedure, to receive, by the UE, an uplink grant for transmission of uplink data, wherein the uplink grant allocates a set of uplink resources from a plurality of available uplink resources for the transmission, and to transmit, by the UE, the uplink data using the set of uplink resources.

In an additional aspect of the disclosure, an apparatus configured for wireless communication is disclosed. The apparatus includes at least one processor, and a memory coupled to the processor. The processor is configured to signal, by a base station, an initial signal in response to establishing a current TxOP over a contention-based shared communication spectrum, to receive, by the base station, an uplink control message from one or more served UEs, wherein the uplink control message includes a CCA status report reporting results of a CCA procedure conducted by the one or more served UEs, to schedule, by the base station, the one or more served UEs for uplink transmissions on a set of resources of a plurality of available uplink resources, wherein the set of resources is selected based on the CCA status report, to transmit, by the base station, an uplink grant for the uplink transmissions to the one or more UEs, wherein the uplink grant identifies the set of uplink resources, and to receive, by the base station, uplink data from the one or more served UEs on the set of uplink resources.

In an additional aspect of the disclosure, an apparatus configured for wireless communication is disclosed. The apparatus includes at least one processor, and a memory coupled to the processor. The processor is configured to identify, by a UE, an initial signal from a serving base station over a contention-based shared communication spectrum, wherein the initial signal identifies establishment of a current base station TxOP, to perform, by the UE, a CCA procedure on the contention-based shared communication spectrum available for communications by the UE, to generate, by the UE, a reduced format SRS that identifies at least a successful result of the CCA procedure, and to transmit, by the UE, the reduced format SRS identifying the successful result in response to the CCA procedure having the successful CCA procedure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
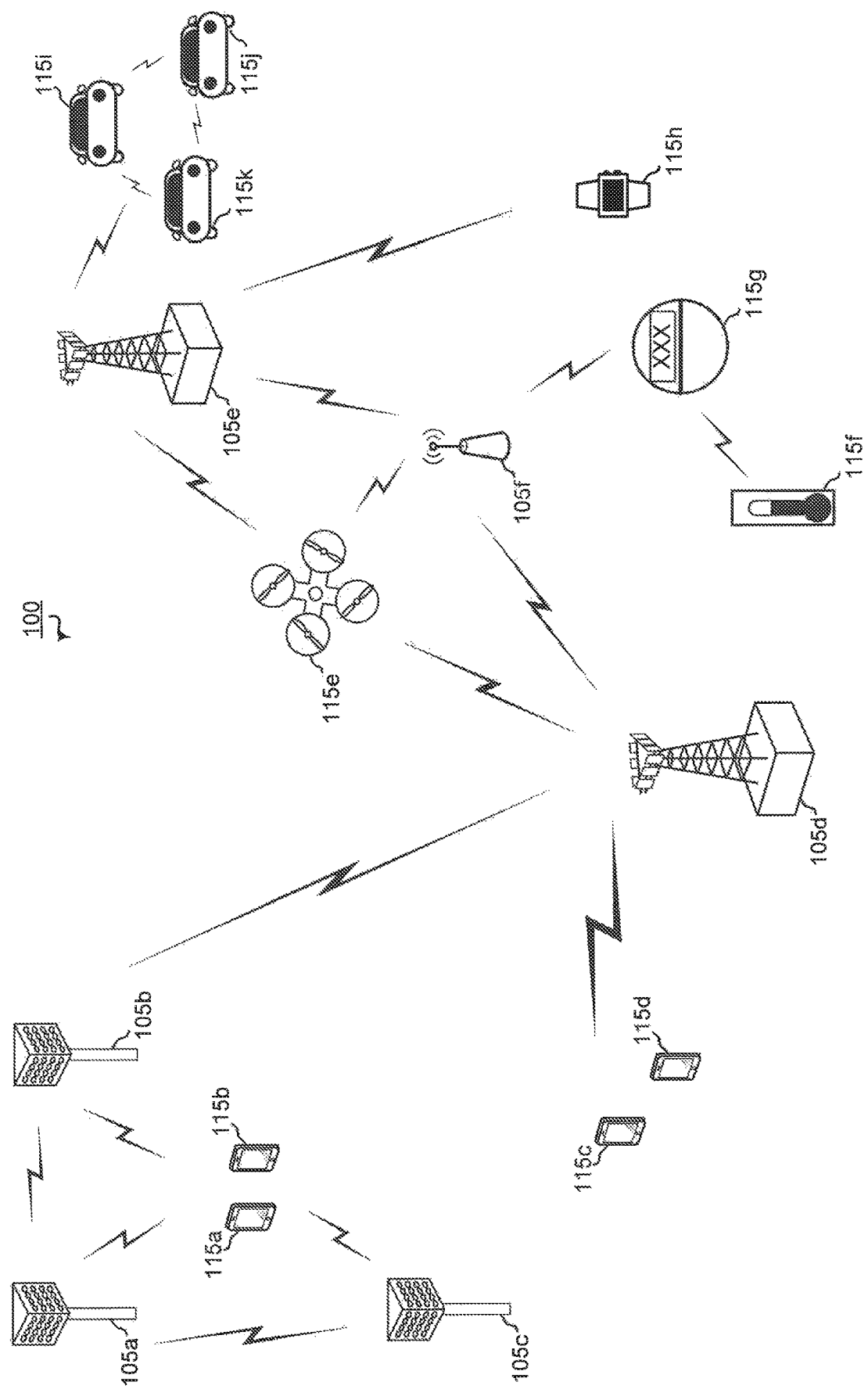
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.5, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UE in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
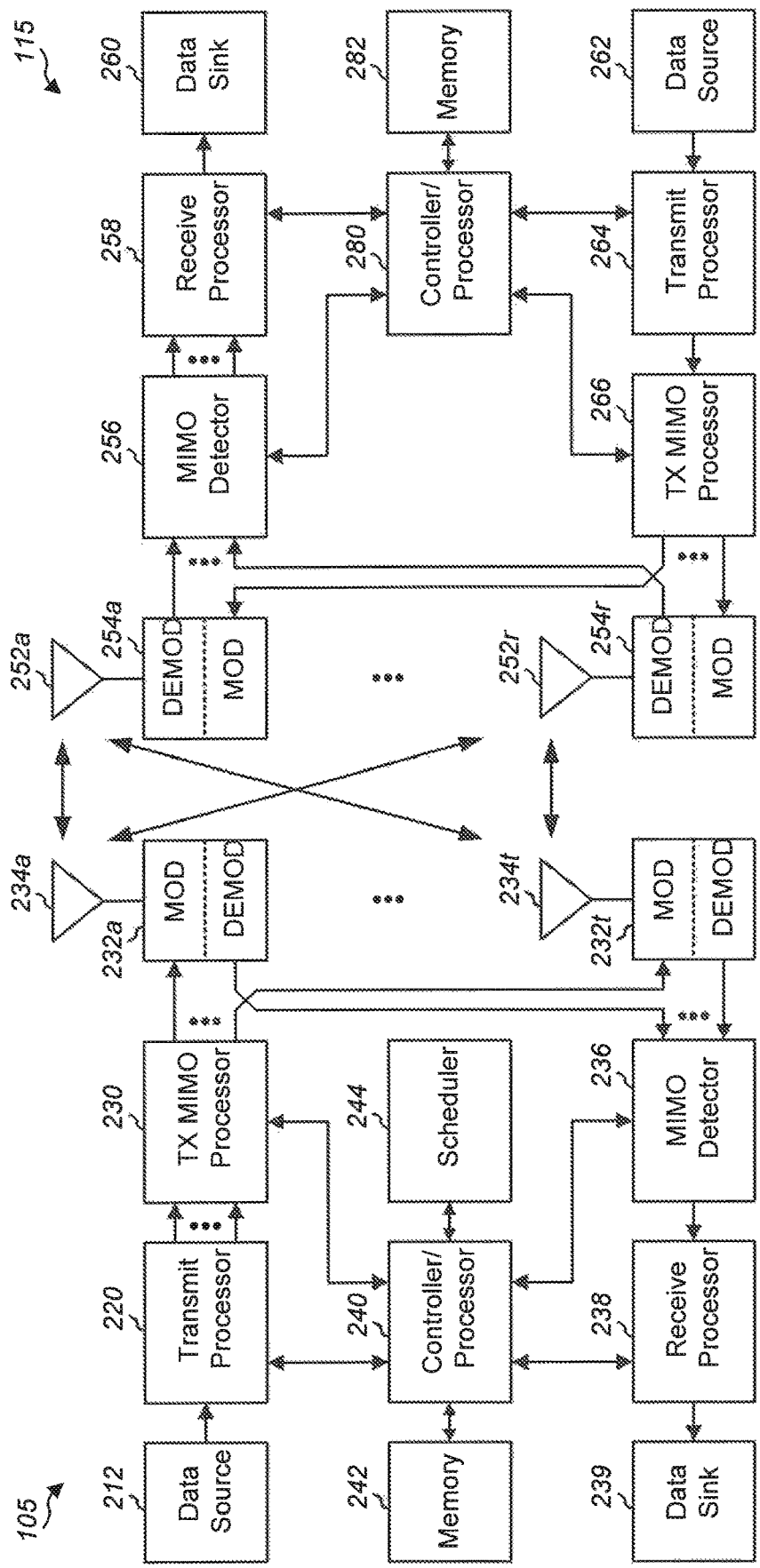
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A, 4B, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
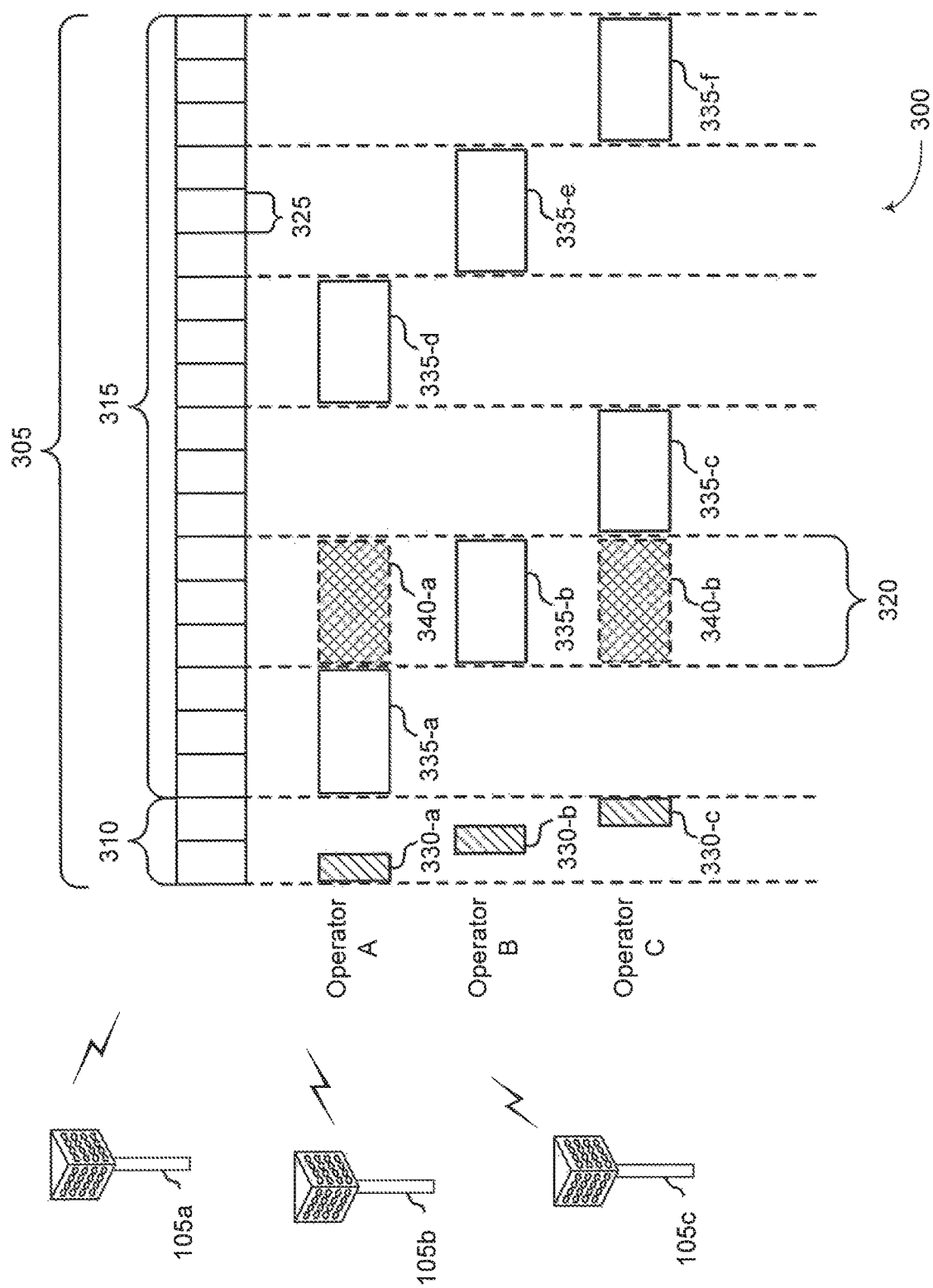
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that either or both of Operator A or Operator B were not going to use its respective G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

With the development of new radio (NR) unlicensed (NR-U) operations, scheduled uplink design has been discussed differently than for prior network operations, such as licensed assisted access (LAA) and enhanced LAA (eLAA)). One of the main considerations for dealing with scheduled uplink in LAA/eLAA networks has been the standard n+4 signaling/processing delay between the uplink grant in a PDCCH and the resulting actual uplink transmission. Such scheduled uplink designs in LAA/eLAA rely on multi-subframe as well as cross transmission opportunity (TxOP) scheduling. Moreover, a listen before talk (LBT) procedure is performed by UEs for switching points between downlink and uplink slots. For example, abbreviated or category 2 (Cat-2) LBT procedures may be used by such UEs prior to uplink transmission on the downlink-to-uplink slot switching point.

The design of NR networks offers a general reduced latency in transmissions and processing delay. Such a reduction in latencies offers the potential for new designs in scheduled transmissions, including scheduled uplink. NR-U operations may support multiple downlink-to-uplink switching points while offering reasonable UE clear channel assessment (CCA) solutions. For example, in a first possible NR operation for scheduled uplink, a UE may be scheduled for a short multi-symbol uplink transmission (e.g., enough OFDMA symbols to transmit PUCCH and a mini-slot PUSCH) without requiring CCA, when the uplink transmission begins very soon after the downlink ends (e.g., 10-20 µs). In a second possible NR operation for scheduled uplink, when the UE has more data for transmission than could be handled in such a short number of symbols, the UE would perform the CCA procedure prior to uplink transmission (e.g., PUSCH). The various aspects of the present disclosure provide for operations that may efficiently provide for scheduled uplink transmissions including for OFDMA uplink.

Figure 4:
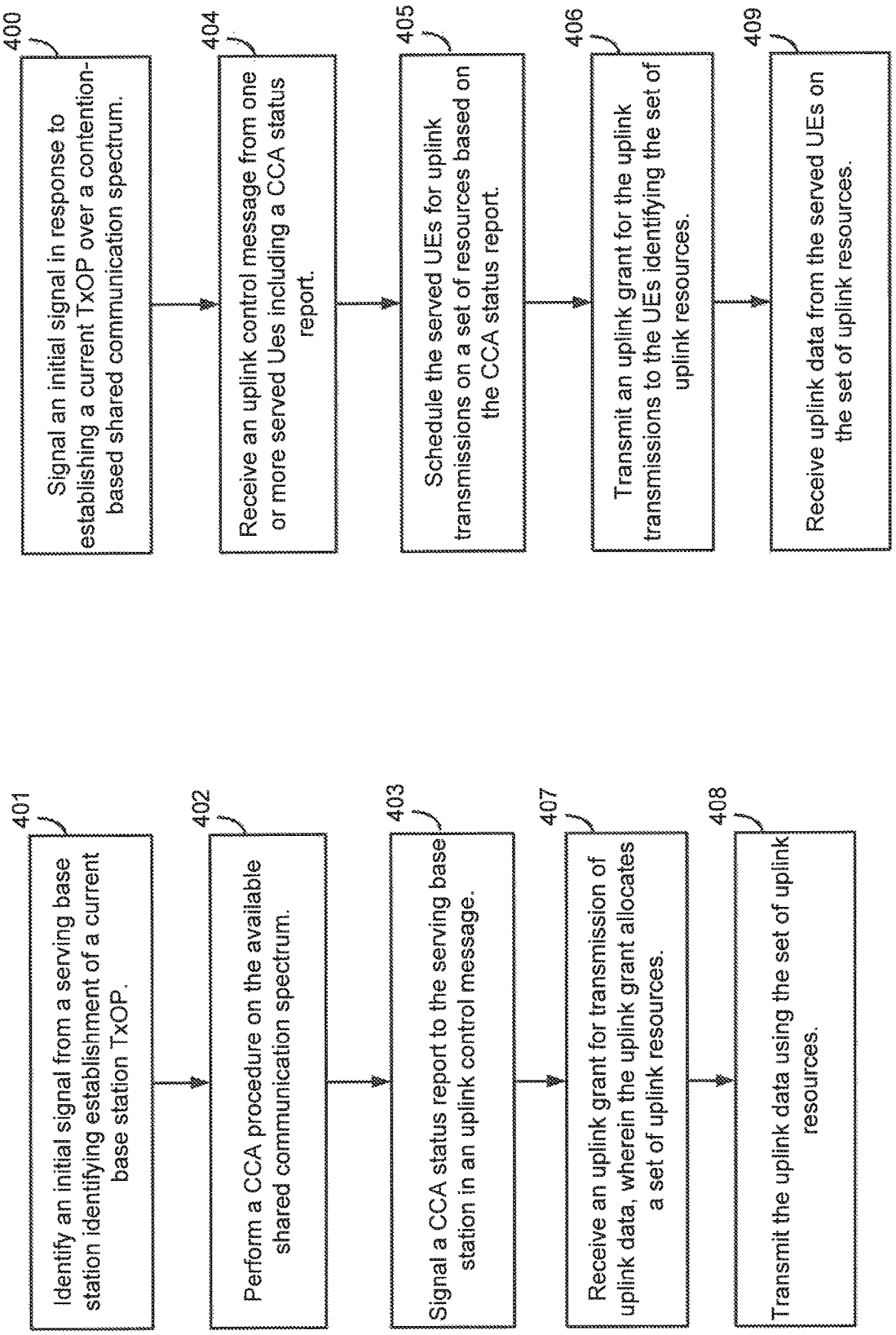
FIGS. 4A and 4B are block diagrams illustrating example blocks executed to implement aspects of the present disclosure.
Figure 8:
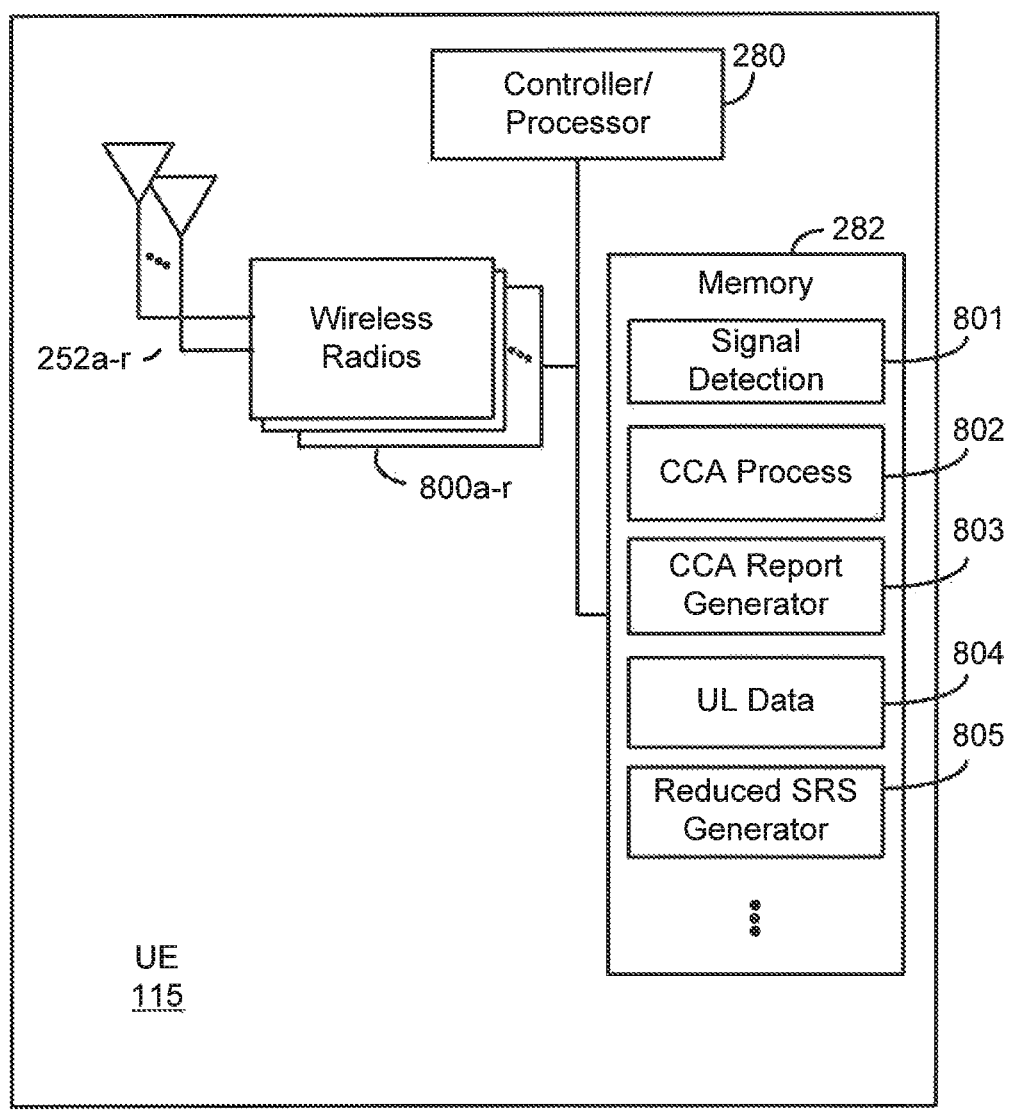
FIG. 8 is a block diagram illustrating an example UE configured according to one aspect of the present disclosure.

FIGS. 4A and 4B are block diagrams illustrating example blocks executed by a base station (FIG. 4B) and a UE (FIG. 4A) configured according to aspects of the present disclosure. The example blocks of FIG. 4A will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

Figure 9:
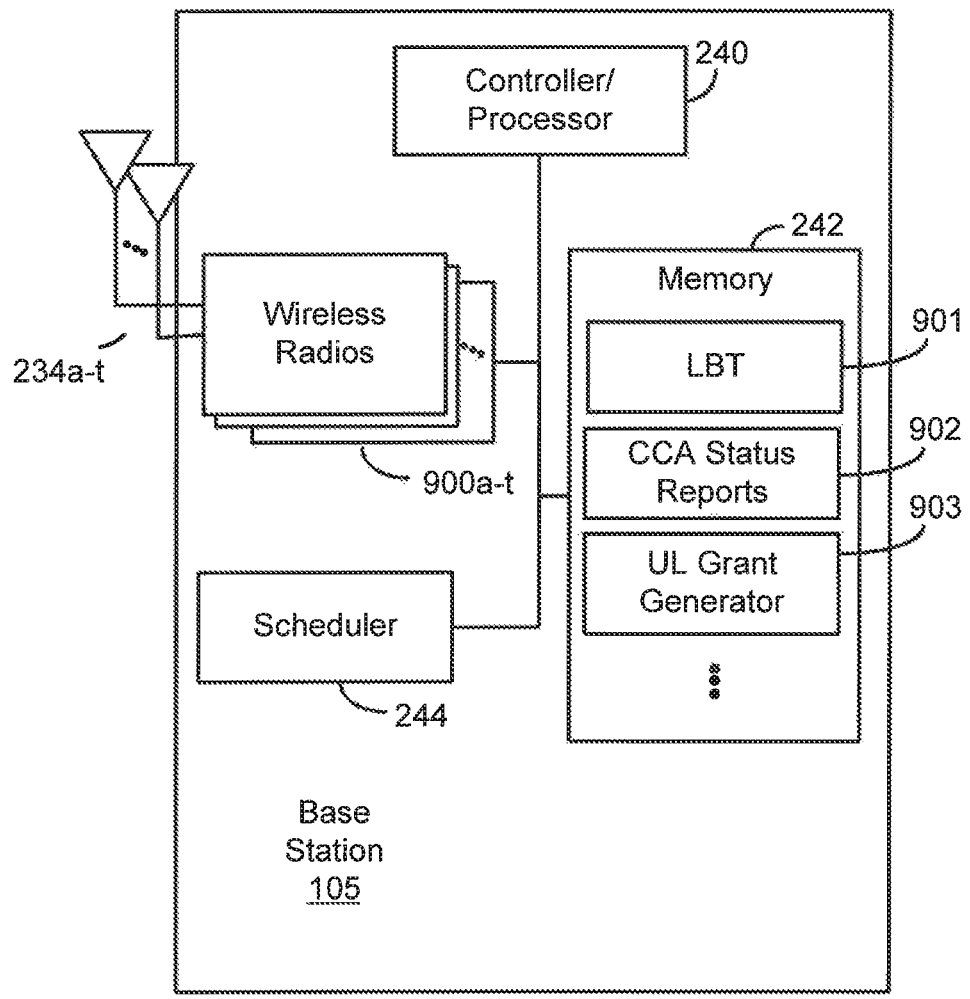
FIG. 9 is a block diagram illustrating an example base station configured according to one aspect of the present disclosure.

The example blocks of FIG. 4B will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-t and antennas 234a-t. Wireless radios 900a-t includes various components and hardware, as illustrated in FIG. 2 for base station 105, including modulator/demodulators 232a-t, MIMO detector 236, receive processor 238, transmit processor 220, and TX MIMO processor 230.

At block 400, a base station signals an initial signal in response to establishing a current TxOP over a contention-based shared communication spectrum. The base station, such as base station 105, has typically successfully performed a listen before talk (LBT) procedure (e.g., CCA, extended CCA, etc.) to secure access to the shared communication spectrum. Base station 105, under control of controller/processor 240, executes LBT logic 901, in memory 242. The execution environment of LBT logic 901 provides the functionality of the LBT procedure. Once base station 105 completes the LBT procedure and secures the shared communication spectrum, base station 105 will transmit an initial signal or preamble signal on the active resources via wireless radios 900a-t and antennas 234a-t.

At block 401, a UE identifies the initial signal from a serving base station over a contention-based shared communication spectrum, wherein the initial signal identifies establishment of a current base station TxOP. For example, a UE, such as UE 115, under control of controller/processor 280, executes signal detection logic 801, stored in memory 282. The execution environment of signal detection logic 801 provides the functionality to measure and detect signals received via antennas 252a-r and wireless radios 800a-r. As UE 115 detects the initial signal, it determines that there may be opportunity for uplink transmissions within the base station TxOP.

At block 402, the UE performs a CCA procedure on the contention-based shared communication spectrum available for communications by the UE. Under control of controller/processor 280, UE 115 executes CCA logic 802, stored in memory 282. The execution environment of CCA logic 802 provides UE 115 the functionality to measure the shared communication spectrum for occupying signals. Within the execution environment of CCA logic 802, UE 115 performs such CCA measurements on the available uplink resources. The configuration of the execution environment of CCA logic 802 may allow UE 115 to perform such CCA measurements prior to detecting the initial signal from the base station or in response to the detection. UE 115 may further perform such measurements prior to the initial signal or in instances of zero power channel state information reference signals (ZP-CSI-RS).

At block 403, the UE signals a CCA status report to the serving base station in an uplink control message, wherein the CCA status report reports a result of the CCA procedure. After obtaining the CCA results, UE 115, under control of controller/processor 280, executes CCA report generator 803, in memory 282. The execution environment of CCA report generator 803 provides the functionality for UE 115 to create a CCA status report and signal the CCA status report in an uplink control message (e.g., UCI or PUCCH) to the serving base station via wireless radios 800*a-r* and antennas 252*a-r*.

At block 404, the base station receives the uplink control message from one or more served UEs, wherein the uplink control message includes a CCA status report reporting results of a CCA procedure conducted by the one or more served UEs. For example, base station 105 receives the uplink control message (e.g., UCI or PUCCH) via antennas 234*a-t* and wireless radios 900*a-t*. Base station 105 extracts the CCA status report from the uplink control message and stores in memory 242 at CCA status reports 902.

At block 405, the base station schedules the one or more served UEs for uplink transmissions on a set of uplink resources of a plurality of available uplink resources, wherein the set of uplink resources is selected based on the CCA status report. Base station 105, under control of controller/processor 240, controls scheduler 244 to schedule uplink transmissions. Scheduler 244 may use the results of the CCA measurements at CCA status reports 902 to schedule the UE for uplink transmissions or to reserve uplink resources.

At block 406 the base station transmits an uplink grant for the uplink transmissions to the one or more UEs, wherein the uplink grant identifies the set of uplink resources. Once scheduled with the resources allocated, base station 105, under control of controller/processor 240, executes uplink grant generator 903 in memory 242. The execution environment of uplink grant generator 903 provides base station 105 the functionality to create the uplink grant for the UE that identifies the uplink resources allocated for transmissions. Base station 105 then transmits the uplink grant to the UE via wireless radios 900*a-t* and antennas 234*a-t*.

At block 407, the UE receives the uplink grant for transmission of uplink data, wherein the uplink grant allocates a set of uplink resources from a plurality of available uplink resources for the transmission. UE 115 receives the uplink grant via antennas 252*a-r* and wireless radios 900*a-r*. UE 115 identifies the set of uplink resources for transmission and may tune wireless radios 900*a-r* for those resources.

At block 408, the UE transmits the uplink data using the set of uplink resources. After UE 115 receives the uplink grant identifying the uplink resources, it may transmit uplink data 804, in memory 282, via wireless radios 800*a-r* and antennas 252*a-r* according to the set of resources received from the serving base station.

At block 409, the base station receives uplink data from the one or more served UEs on the set of uplink resources. Base station 105 will receive the uplink data transmitted by the UE via antennas 234*a-t* and wireless radios 900*a-t* on the allocated set of resources.

Figure 5:
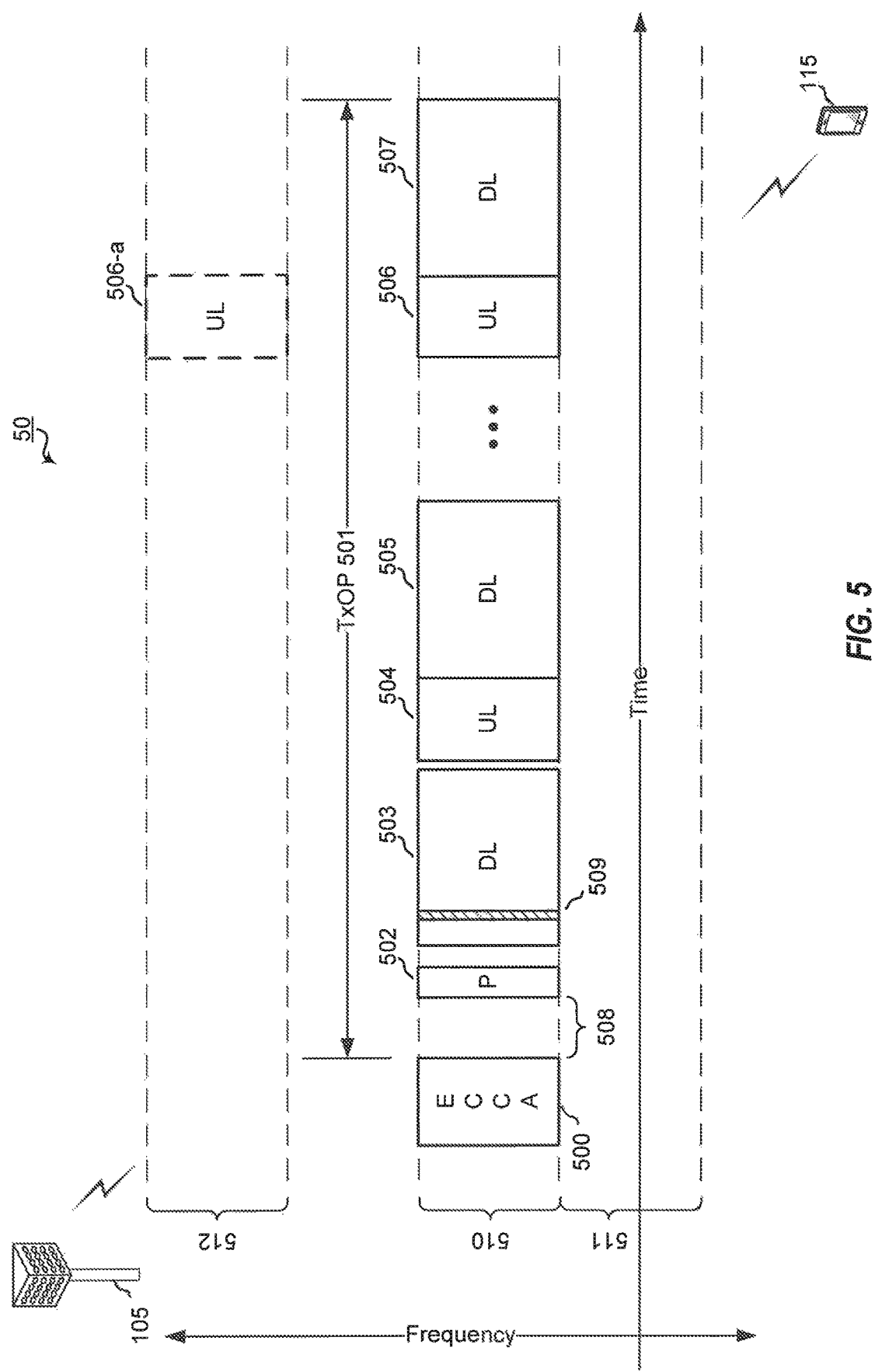
FIG. 5 is a block diagram illustrating an NR-U network with a base station and UE, each configured according to one aspect of the present disclosure.

FIG. 5 is a block diagram illustrating an NR-U network 50 with base station 105 and UE 115, each configured according to one aspect of the present disclosure. Base station 105 and UE 115 engage in communications over a contention-based shared communication spectrum. When competing for access to the communication spectrum, base station 105 performs an LBT procedure, such as extended CCA 500. When extended CCA 500 is successful, TxOP 501 for base station 105 begins. Base station 105 will prepare and transmit a preamble or initial signal 502 indicating the beginning of TxOP 501. The remaining channel access for TxOP 501 may be divided into a number of downlink and uplink slots (e.g., downlink slots 503, 505, and 507, and uplink slots 504 and 506). In operations according to an example aspect of the present disclosure, UE 115 may perform a CCA procedure. For example, UE 115 may perform CCA measurements at 508, just prior to base station 105 transmitting initial signal 502, such as before the front-loaded demodulation reference signal (DMRS) of a PDCCH. Alternatively, UE 115 may perform CCA measurements during any occasion of zero power channel state information reference signals (ZP-CSI-RS), such as ZP-CSI-RS 509 from base station 105. When measuring over ZP-CSI-RS, UE 115 may perform frequency domain processing when ZP-CSI-RS does not occupy the whole BWP. ZP-CSI-RS is allocated considering relevant interlace designs in NR-U, thus, the CCA measurements can be performed for each uplink interlace.

UE 115 may perform CCA measurements using energy detection (ED) or preamble detection (PD). Thus, when performing an ED-based CCA measurement, UE 115 monitors for any signals on the shared communication spectrum above the ED threshold level. Similarly, when performing a PD-based CCA measurement, UE 115 monitors for signals and attempts to decode the preamble in any signals detected. When such preambles are decoded by UE 115, it would determine the spectrum to be occupied and conclude the CCA as unsuccessful.

As UE 115 detects initial signal 502 and determines that it may be able to transmit during TxOP 501, UE 115 generates an uplink control message that includes a CCA report that identifies the status of the CCA measurements. UE 115 may then transmit this uplink control message during uplink slot 504. The uplink control message may be an uplink control information (UCI), physical uplink control channel (PUCCH), or the like. PUCCH provides code division multiple (CDM) capabilities that may be beneficial for reliable transmission. Base station 105 uses the CCA report to determine accessibility of the shared spectrum for uplink transmissions of UE 115. With the CCA information for the served UEs, base station 105 may schedule and grant uplink transmissions. For example, after receiving the uplink control message with the CCA report in uplink slot 504, base station 105 schedules UE 115 for uplink transmission during uplink slot 506. Base station 105 would then send the uplink grant for this transmission along with allocation of the uplink resources during downlink slot 505.

In additional aspects illustrated in FIG. 5, UE 115 is allocated with system bandwidth that may include many smaller bandwidth parts (BWPs) for use in uplink transmissions. For example, the allocated uplink bandwidth for UE 115, as illustrated, covers three 20 MHz channels, the active channel, channel 510, in additional to channels 511 and 512. UE performs CCA measurements over each of channels 510-512. There may be one active BWP, e.g., channel 510, but UE 115 would perform the CCA measurements over all available uplink bandwidth, channels 510-512. The uplink control message transmitted by UE 115 would include CCA outputs of not only the active BWP, channel 510, but also the for the channels 511 and 512, over which UE 115 may transmit uplink data.

By providing CCA output for bandwidth outside of the currently active BWP, base station 105 may facilitate bandwidth switching in order to take advantage of more favorable channel access capabilities. For example, after receiving the uplink control message from UE 115 that includes CCA results for all of the available uplink bandwidth (channels 510-512), base station 105 recognizes that UE 115 may have clear spectrum at channel 512, which in not within the active BWP, channel 510. However, within the uplink grant transmitted by base station 105 to UE 115 at downlink slot 505, base station 105 allocates resources for UE 115 to perform its uplink transmissions at slot 506-a on channel 512.

Figure 6:
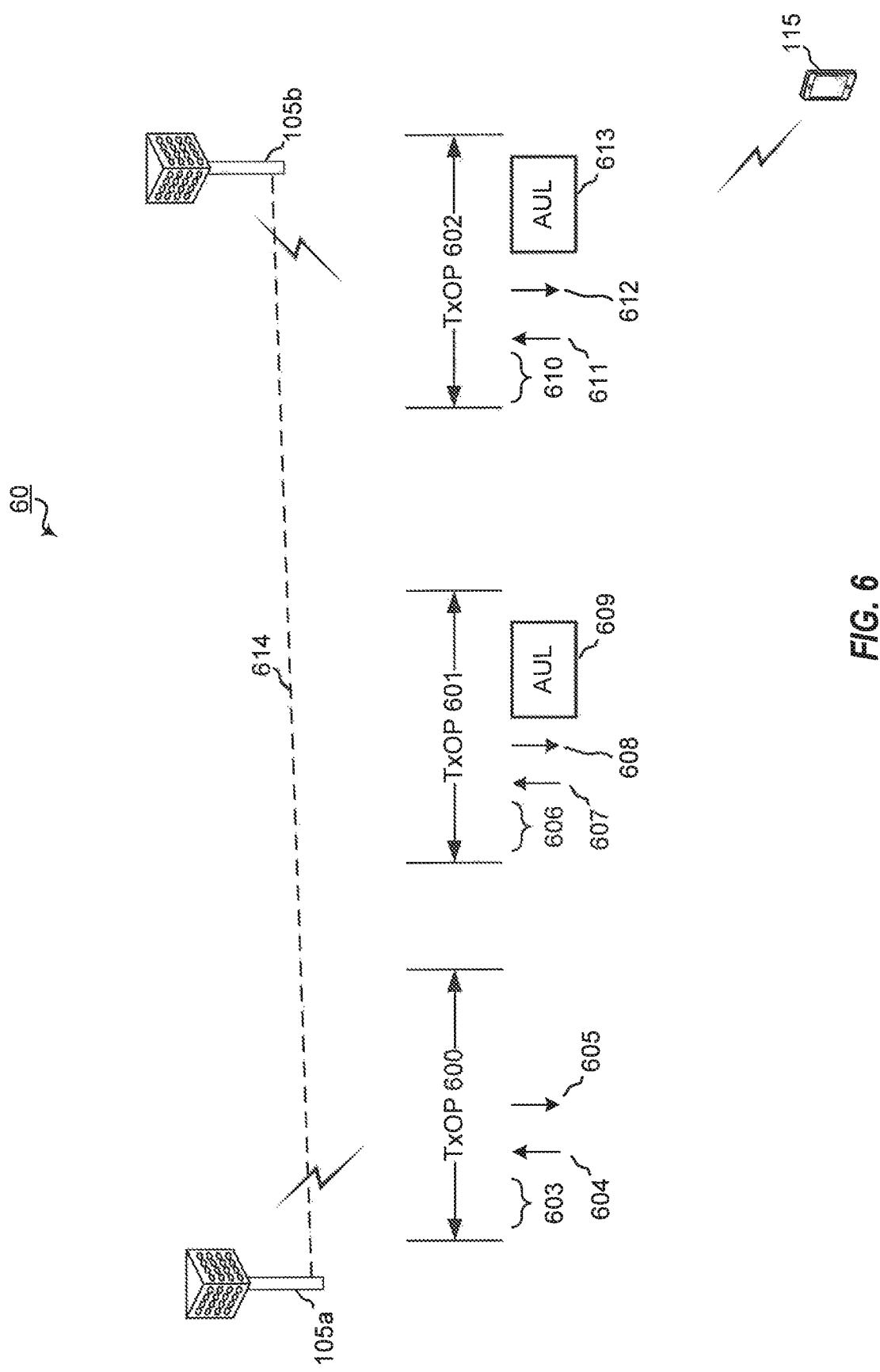
FIG. 6 is a block diagram illustrating an example NR-U network having a base station and UE each configured according to one aspect of the present disclosure.

FIG. 6 is a block diagram illustrating an example NR-U network 60 having base station 105a and UE 115 each configured according to one aspect of the present disclosure. The illustrated portion of NR-U network 60 provides communications over multiple transmission opportunities (TxOP 600-602). Communications occur in NR-U network 60 over contention-based shared communication spectrum. Within each TxOP 600-602, UE 115 takes CCA measurements over occasion 603, 606, and 610, respectively, and reports the uplink control message to base station 105a at 604, 607, and 611, respectively. As illustrated previously, the CCA report can be used by base station 105a for scheduling uplink transmissions and reserving resources. Base station 105a may send uplink grants that schedule and allocate resources for uplink transmission to UE 115 at 605, 608, and 612, respectively.

Resources may further be reserved for autonomous uplink (AUL) transmissions as well. When analyzing the CCA report information, base station 105a may select resources for AUL transmissions. The allocation of AUL resources may occur semi-statically or dynamically. Thus, based on the CCA report received in TxOP 600, base station 105a determines AUL resources 609 and reports the allocated resources to each served UE, such as UE 115. Similarly, for the CCA report received in TxOP 601, base station 105a may use the CCA information from both TxOP 600 and 601 to determine the best AUL resources 613 for allocation to AUL transmission in TxOP 602.

Additional aspects of the present disclosure, as illustrated in FIG. 6, provide for base station 105a to assist in making a network-initiated handover decision. In such example aspects, base station 105a accumulates the uplink control messages with the uplink CCA measurements for UE 115 transmitted in uplink in each of TxOPs 600, 601, and 602. In accumulating the CCA measurements, base station 105a may determining the trend in interference or accessibility or the like and, based on that trend or an increase in interference, base station 105a may make a network-initiated handover decision. For example, at TxOP 602, base station 105a analyzes CCA results from the CCA reports received over the course of TxOP 600, 601, and 602. Based on those results, base station 105a may trigger a network-initiated handover to handover UE 115 to base station 105b. Base station 105a would then signal base station 105b to begin the handover process via backhaul 614. A handover trigger may be further communicated to UE 115 at 612 that identifies the beginning of the handover process.

In additional aspect of the present disclosure, as illustrated in FIG. 6, the CCA reports from UE 115 may allow for updating contention window size. Base station 105a or UE 115, using the CCA results included in the CCA report, may determine that the negative acknowledgement or failed CCA rate exceeds a threshold that prompts updating or increasing the size of the contention window up to a maximum length. Similarly, if the negative acknowledgement or failed CCA rate is low, this low rate may further signal updating the contention window by reducing its size to a minimum length. The contention window update may include base station 105a and 105b competing for any of TxOP 600-602, or just in competing for uplink TxOP by UE 115 (when respective contention windows for downlink and another for uplink are available).

It should be noted that various aspects of the present disclosure signal uplink control messages that include the CCA report and results, while additional aspects of the present disclosure may signal the CCA output through a light-weight sounding reference signal (SRS). The light-weight SRS may be used with one sequence to signify a clear or successful CCA, or, in alternative aspects, two different sequences of the light-weight SRS may be defined as one sequence that represents a clear or successful CCA and the other sequence that represents a busy or failed CCA.

Figure 7:
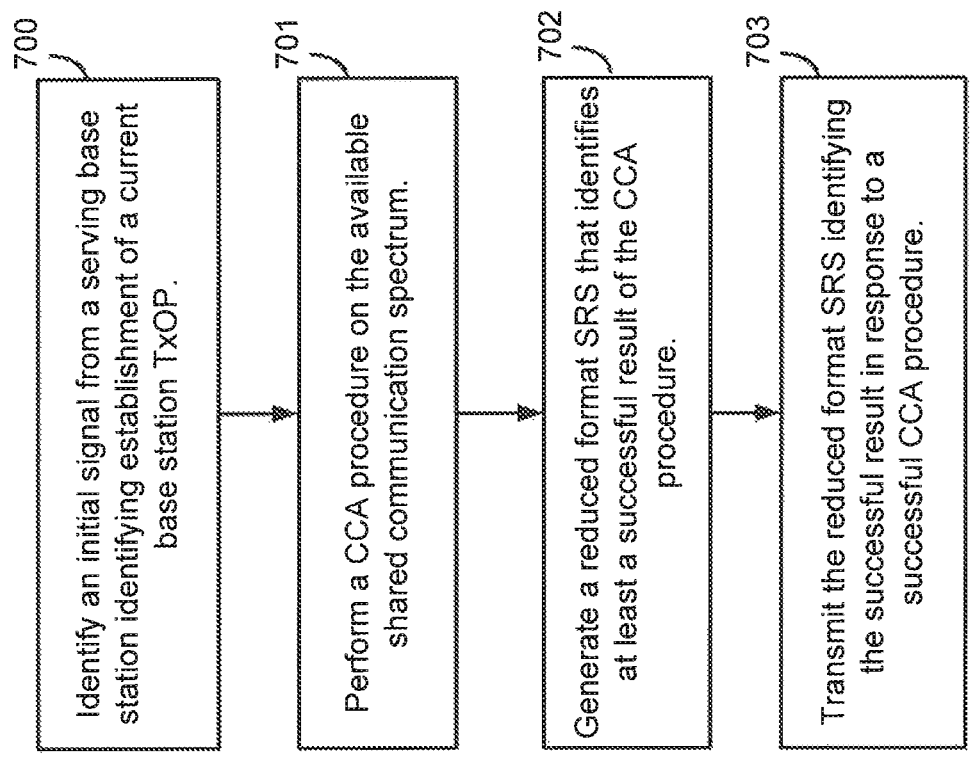
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to UE 115 as illustrated in FIG. 8.

At block 700, a UE identifies an initial signal from a serving base station over a contention-based shared communication spectrum, wherein the initial signal identifies establishment of a current base station TxOP. For example, UE 115, under control of controller/processor 280, executes signal detection logic 801 in memory 282. The execution environment of signal detection logic 801 provides the functionality for UE 115 to detect the initial signal from the signals detected and received via antennas 252a-r and wireless radios 800a-r. The detected initial signal identifies the ability for UE 115 to perform uplink transmissions within the base station's TxOP.

At block 701, the UE performs a CCA procedure on the contention-based shared communication spectrum available for communications by the UE. Under control of controller/processor 280, UE 115 executes CCA logic 802, stored in memory 282. The execution environment of CCA logic 802 provides UE 115 the functionality to measure the shared communication spectrum for occupying signals. Within the execution environment of CCA logic 802, UE 115 performs such CCA measurements on the available uplink resources.

At block 702, the UE generates a reduced format SRS that identifies a result of the CCA procedure. After obtaining the CCA results, UE 115, under control of controller/processor 280, executes CCA report generator 803, in memory 282. The execution environment of CCA report generator 803 provides the functionality for UE 115 to create an indication of the CCA results. The execution environment of CCA report generator 802 triggers execution of reduced SRS generator 805, in memory 282. The execution environment of reduced SRS generator 805 provides the functionality to UE 115 to use the results of the CCA measurements to generate a light-weight or reduced format SRS. In one aspect, only a clear or successful CCA would trigger generation of the light-weight SRS, while in additional aspects, the UE would select the sequence of light-weight SRS based on whether the CCA check was clear or busy. In such aspects, the different results of the CCA measurements would cause selection of a different sequence of light-weight SRS.

At block 703, the UE transmits the reduced format SRS identifying the result in response to completion of the CCA procedure. Once generated, UE 115 transmits the light-weight SRS to signal the serving base station of its CCA results via wireless radios 800a-r and antennas 252a-r. As noted above, in a first example aspect, the reduced format SRS is triggered in response to a clear or successful CCA. Other aspects may trigger the reduced format SRS for either success or failure of the CCA procedure.

For additional or alternative aspects of the present disclosure that utilize the light-weight SRS for reporting CCA results, the network may provide that no LBT procedure would be performed by the UE in order to transmit such light-weight SRS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A, 4B, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
 identifying, by a user equipment (UE), an initial signal from a serving base station over a contention-based shared communication spectrum, wherein the initial signal identifies establishment of a current base station transmission opportunity (TxOP);

performing, by the UE, a clear channel assessment (CCA) procedure on the contention-based shared communication spectrum available for communications by the UE;

signaling, by the UE, a CCA status report to the serving base station in an uplink control message, wherein the CCA status report reports a result of the CCA procedure;

receiving, by the UE, an uplink grant for transmission of uplink data, wherein the uplink grant allocates a set of uplink resources from a plurality of available uplink resources for the transmission; and transmitting, by the UE, the uplink data using the set of uplink resources.

2. The method of claim 1, wherein the performing the CCA procedure includes:

performing a CCA measurement prior to the initial signal from the serving base station during the current base station transmission opportunity (TxOP).

3. The method of claim 2, wherein the performing the CCA measurement includes performing the CCA measurement on the plurality of available uplink resources of the contention-based shared communication spectrum, and wherein the result in the CCA status report includes the result of the CCA procedure on the plurality of available uplink resources.

4. The method of claim 2, wherein the performing the CCA measurement includes one of:

measuring the contention-based shared communication spectrum for energy above an energy detection threshold; or monitoring the contention-based shared communication spectrum for a known preamble signal.

5. The method of claim 4, wherein the known preamble signal includes one or more of: a WiFi preamble signal, or a new radio (NR) unlicensed (NR-U) preamble signal.

6. The method of claim 1, wherein the performing the CCA procedure includes:

performing a CCA measurement at one or more zero power channel state information reference signals (ZP-CSI-RS) in each interlace of one or more allocated uplink interlaces in the current base station TxOP.

7. The method of claim 6, wherein the performing the CCA measurement includes:

determining, by the UE, that the one or more ZP-CSI-RS fails to occupy an entire bandwidth of an allocated bandwidth part (BWP) of the set of uplink resources; and performing a frequency domain CCA measurement of the one or more ZP-CSI-RS.

8. The method of claim 1, further including:

determining, by the UE, a rate of unsuccessful CCA based on the result of the CCA procedure;

updating, by the UE, a contention window size for a subsequent uplink TxOP when the rate of unsuccessful CCA exceeds a predetermined threshold rate.

9. The method of claim 1, wherein the signaling is performed within the current base station TxOP.

10. A method of wireless communication, comprising:

signaling, by a base station, an initial signal in response to establishing a current transmission opportunity (TxOP) over a contention-based shared communication spectrum;

receiving, by the base station, an uplink control message from one or more served user equipments (UEs), wherein the uplink control message includes a CCA status report reporting results of a CCA procedure conducted by the one or more served UEs;

scheduling, by the base station, the one or more served UEs for uplink transmissions on a set of uplink resources of a plurality of available uplink resources, wherein the set of uplink resources is selected based on the CCA status report;

transmitting, by the base station, an uplink grant to the one or more UEs, wherein the uplink grant identifies the set of uplink resources; and receiving, by the base station, uplink data from the one or more served UEs on the set of uplink resources.

11. The method of claim 10, wherein the CCA status report includes the results of the CCA procedure on the plurality of available uplink resources, and wherein the scheduling includes selecting the set of uplink resources of the plurality of available uplink resources based on the CCA status report.

12. The method of claim 10, further including:

reserving, by the base station, a set of autonomous uplink resources based on the CCA status report; and transmitting, by the base station, an autonomous uplink configuration message identifying the set of autonomous uplink resources.

13. The method of claim 10, further including:

accumulating, by the base station, the CCA status report for the one or more served UEs over a plurality of transmission opportunities in a set of accumulated CCA status reports for the one or more served UEs;

determining, by the base station, a handover decision of the one or more served UEs based on the set of accumulated CCA status reports; and signaling, by the base station, a target base station and the one or more served UEs for a handover in response to the handover decision indicating the handover to the target base station.

14. The method of claim 10, further including:

determining, by the base station, a rate of unsuccessful CCA based on the result of the CCA procedure;

updating, by the base station, a contention window size for a subsequent base station TxOP when the rate of unsuccessful CCA exceeds a predetermined threshold rate.

15. An apparatus configured for wireless communication, the apparatus comprising:

at least one processor; and a memory coupled to the at least one processor, wherein the at least one processor is configured:

to identify, by a user equipment (UE), an initial signal from a serving base station over a contention-based shared communication spectrum, wherein the initial signal identifies establishment of a current base station transmission opportunity (TxOP);

to perform, by the UE, a clear channel assessment (CCA) procedure on the contention-based shared communication spectrum available for communications by the UE;

to signal, by the UE, a CCA status report to the serving base station in an uplink control message, wherein the CCA status report reports a result of the CCA procedure;

to receive, by the UE, an uplink grant for transmission of uplink data, wherein the uplink grant allocates a set of uplink resources from a plurality of available uplink resources for the transmission; and to transmit, by the UE, the uplink data using the set of uplink resources.

16. The apparatus of claim 15, wherein the configuration of the at least one processor to perform the CCA procedure includes configuration of the at least one processor to perform a CCA measurement prior to the initial signal from the serving base station during the current base station TxOP.

17. The apparatus of claim 16,
wherein the configuration of the at least one processor to perform the CCA measurement includes configuration to perform the CCA measurement on the plurality of available uplink resources of the contention-based shared communication spectrum, and
wherein the result in the CCA status report includes the result of the CCA procedure on the plurality of available uplink resources.

18. The apparatus of claim 16, wherein the configuration of the at least one processor to perform the CCA measurement includes configuration of the at least one processor to one of:
measure the contention-based shared communication spectrum for energy above an energy detection threshold; or
monitor the contention-based shared communication spectrum for a known preamble signal.

19. The apparatus of claim 18, wherein the known preamble signal includes one or more of: a WiFi preamble signal, or a new radio (NR) unlicensed (NR-U) preamble signal.

20. The apparatus of claim 15, wherein the configuration of the at least one processor to perform the CCA procedure includes configuration of the at least one processor to perform a CCA measurement at one or more zero power channel state information reference signals (ZP-CSI-RS) in each interlace of one or more allocated uplink interlaces in the current base station TxOP.

21. The apparatus of claim 20, wherein the configuration of the at least one processor to perform the CCA measurement includes configuration of the at least one processor:
to determine, by the UE, that the one or more ZP-CSI-RS fails to occupy an entire bandwidth of an allocated bandwidth part (BWP) of the set of uplink resources; and
to perform a frequency domain CCA measurement of the one or more ZP-CSI-RS.

22. The apparatus of claim 15, further including configuration of the at least one processor:
to determine, by the UE, a rate of unsuccessful CCA based on the result of the CCA procedure;
to update, by the UE, a contention window size for a subsequent uplink TxOP when the rate of unsuccessful CCA exceeds a predetermined threshold rate.

23. The apparatus of claim 15, wherein the configuration of the at least one processor to signal is executed within the current base station TxOP.

* * * * *